(12) United States Patent
Mordukhovich et al.

(10) Patent No.: US 9,933,024 B2
(45) Date of Patent: Apr. 3, 2018

(54) VARIABLE TWO-WAY OVER-RUNNING CLUTCH

(71) Applicant: AVL Powertrain Engineering, Inc., Plymouth, MI (US)

(72) Inventors: Gregory Mordukhovich, Bloomfield Hills, MI (US); Michael Kozan, Canton, MI (US)

(73) Assignee: AVL POWERTRAIN ENGINEERING, INC., Plymouth, MI (US)

( * ) Notice: Subject to any disclaimer, the term of this patent is extended or adjusted under 35 U.S.C. 154(b) by 242 days.

(21) Appl. No.: 14/690,672

(22) Filed: Apr. 20, 2015

(65) Prior Publication Data

US 2016/0069400 A1 Mar. 10, 2016

Related U.S. Application Data

(60) Provisional application No. 62/046,258, filed on Sep. 5, 2014.

(51) Int. Cl.
| | |
|---|---|
| F16D 41/08 | (2006.01) |
| F16D 25/062 | (2006.01) |
| F16D 25/0635 | (2006.01) |
| F16D 25/065 | (2006.01) |
| F16D 41/04 | (2006.01) |
| F16D 41/16 | (2006.01) |

(52) U.S. Cl.
CPC ......... *F16D 41/088* (2013.01); *F16D 25/062* (2013.01); *F16D 25/065* (2013.01); *F16D 25/0635* (2013.01); *F16D 41/04* (2013.01); *F16D 41/16* (2013.01); *F16D 2300/18* (2013.01)

(58) Field of Classification Search
CPC ....... F16H 41/088; F16H 41/086; F16D 17/00
See application file for complete search history.

(56) References Cited

U.S. PATENT DOCUMENTS

| | | | | |
|---|---|---|---|---|
| 2,386,071 A | * | 10/1945 | Stephenson | F16D 17/00 192/103 C |
| 2,433,484 A | | 12/1947 | Roth | |
| 4,531,893 A | | 7/1985 | Okoh et al. | |
| 4,901,831 A | * | 2/1990 | Ito | B62D 5/043 180/444 |
| 5,135,084 A | * | 8/1992 | Ito | B62D 5/043 192/38 |
| 6,338,402 B1 | | 1/2002 | Muramatsu et al. | |
| 6,557,681 B2 | | 5/2003 | Kinoshita et al. | |
| 6,629,590 B2 | | 10/2003 | Ochab et al. | |

(Continued)

*Primary Examiner* — Stacey Fluhart
(74) *Attorney, Agent, or Firm* — Harness, Dickey & Pierce, P.L.C.

(57) ABSTRACT

A clutch assembly is provided that includes a first shaft, a second shaft, a housing, a two-way over-running clutch, and a friction clutch assembly. The two-way over-running clutch includes an inner race and an outer race. At least one torque transmitting member is disposed between the inner race and the outer race that selectively transfers torque from the inner race to the outer race. The inner race defines at least one cam that receives the torque transmitting member. An inner race actuator selectively controls lock-up of the two-way over-running clutch by moving the inner race relative to the first shaft and the outer race between a concentric position and at least one eccentric position.

32 Claims, 9 Drawing Sheets

(56) References Cited

U.S. PATENT DOCUMENTS

| | | | |
|---|---|---|---|
| 6,763,797 B1 | 7/2004 | Staley et al. | |
| 7,191,881 B2 * | 3/2007 | Tsukada | F16D 41/066 180/219 |
| 8,434,605 B2 | 5/2013 | Shirataki et al. | |
| 9,267,553 B2 | 2/2016 | Mordukhovich | |
| 2006/0289264 A1 * | 12/2006 | Zhong | F16D 7/10 192/48.92 |
| 2013/0048395 A1 * | 2/2013 | Kobayashi | B60K 6/448 180/65.265 |
| 2015/0107953 A1 * | 4/2015 | Lucas | F16D 41/06 192/46 |

* cited by examiner

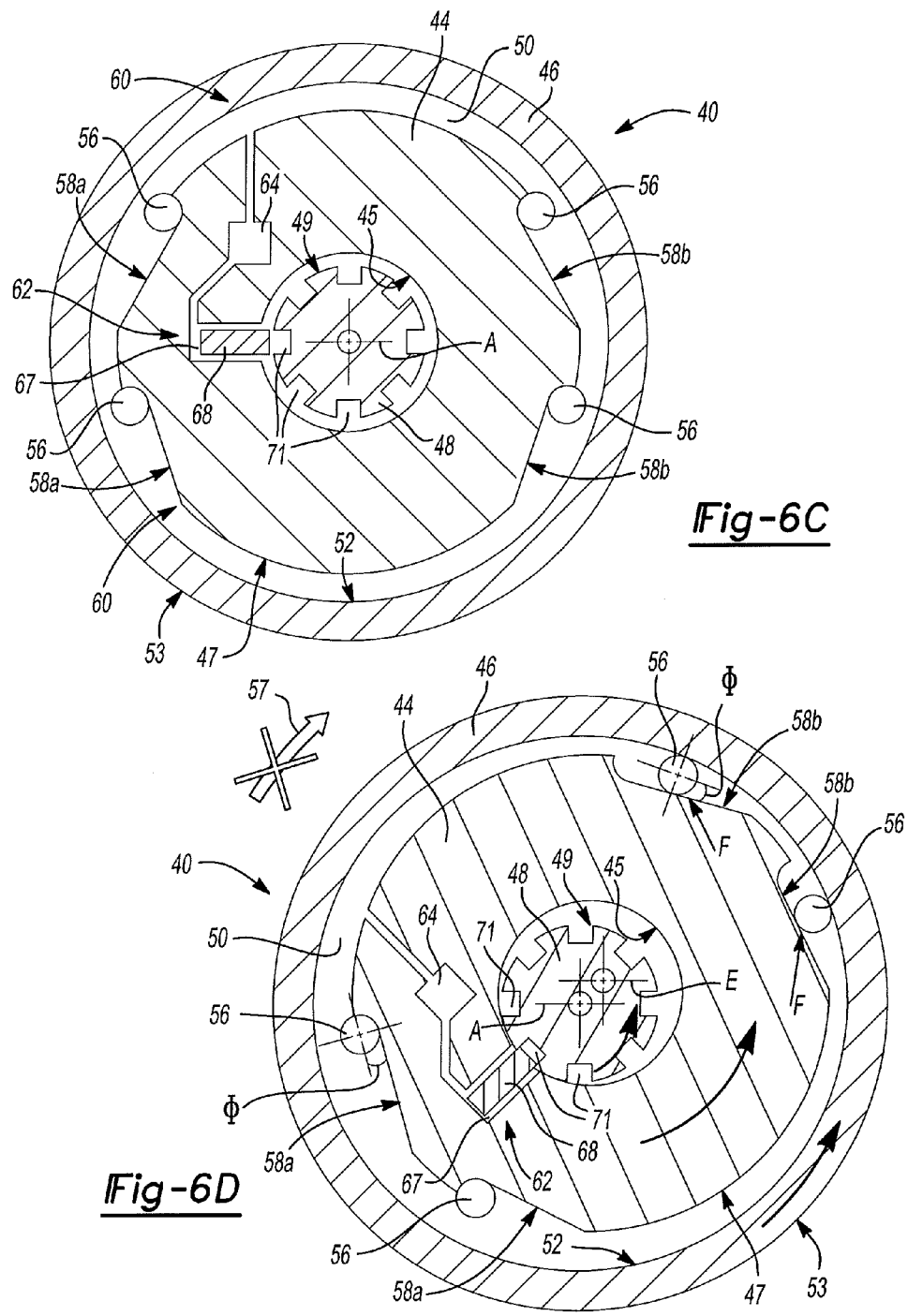

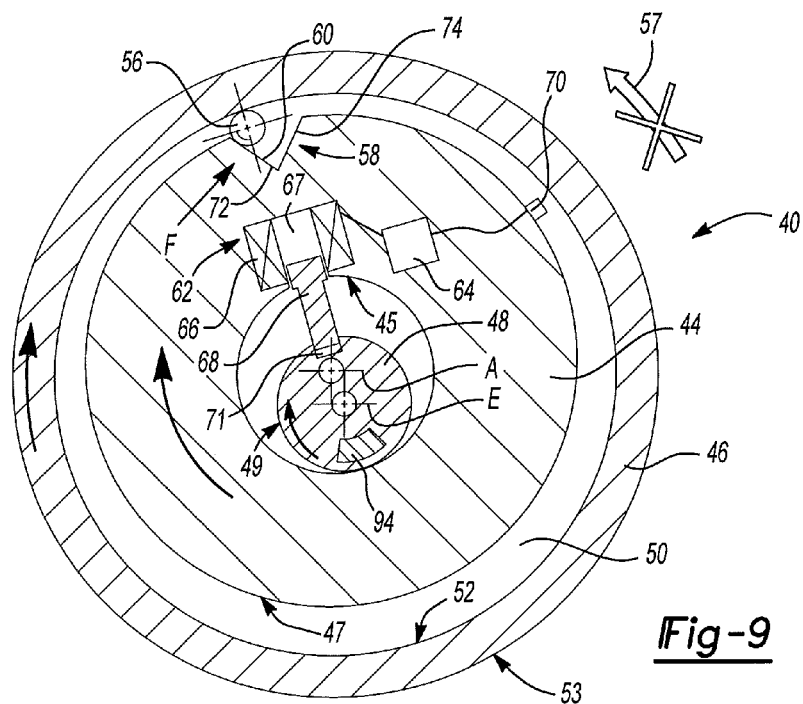
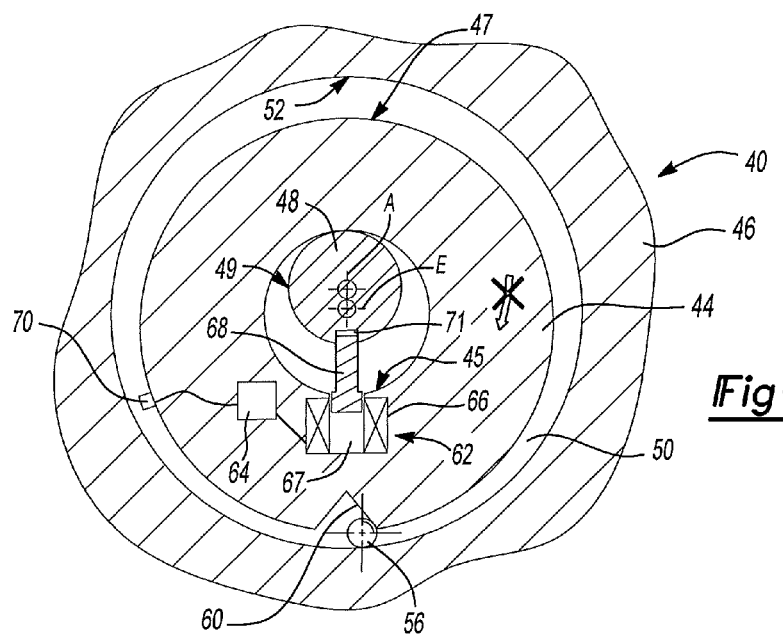

VARIABLE TWO-WAY OVER-RUNNING CLUTCH

CROSS-REFERENCE TO RELATED APPLICATIONS

This application claims the benefit of U.S. Provisional Application No. 62/046,258, filed on Sep. 5, 2014. The entire disclosure of the above application is incorporated herein by reference.

FIELD

The present disclosure relates to transmission clutches and more particularly to a variable two-way over-running clutch.

BACKGROUND

This section provides background information related to the present disclosure which is not necessarily prior art.

Transmission clutches often find utility in vehicles where they modulate the amount of torque applied to transmission components by an engine. Automatic transmissions provide smooth shifting between gears. Planetary and dual-clutch transmissions are two different forms of automatic transmissions. Planetary automatic transmissions may have lower gear sliding-related losses relative to dual-clutch transmissions because planetary automatic transmissions typically have smaller gear modules (shorter gear teeth) than those used in dual-clutch transmissions. In addition, planetary automatic transmissions often utilize lower viscosity lubricant for gear and clutch protection in comparison to dual-clutch transmissions. Nonetheless, planetary automatic transmissions are usually less efficient than dual-clutch transmissions because planetary automatic transmissions utilize a larger number of wet clutches (i.e., friction-plate clutches) in comparison to dual-clutch transmissions, which typically have switch-type clutches such as dog clutches.

Clutch inefficiency in planetary automatic transmissions comes primarily from the drag-related losses associated with spinning the disengaged friction plates of the wet clutches. While drag-related losses can be minimized by providing adequate spacing between the friction plates, such additional spacing typically results in longer shift times and larger overall packaging dimensions.

A dog clutch or other switch-type clutch arrangement may provide a more efficient clutch configuration in its disengaged state. However, use of such switch-type clutches does not allow for appropriate gradual energy dissipation and torque transfer, thereby resulting in abrupt gear shifts. Thus, while wet clutches provide a longer shift time when compared to dog clutches or other switch-type clutch arrangements (and therefore smoother shifts), wet clutches suffer from the disadvantage of spinning losses when disengaged. What is needed is a clutch assembly that has improved efficiency over conventional wet clutch assemblies and reduced noise, vibration, and harshness (smoother shifts) in comparison to dog clutch or other switch-type clutch arrangements.

SUMMARY

This section provides a general summary of the disclosure, and is not a comprehensive disclosure of its full scope or all of its features.

In accordance with one aspect of the subject disclosure, a clutch assembly is provided that includes an first shaft, an inner race, an outer race, at least one torque transmitting member, and an actuator. The inner race is rotatably coupled to the first shaft and the outer race is disposed annularly about the inner race. Either the inner race or the outer race is moveable in a radial direction with respect to the first shaft. The at least one torque transmitting member is disposed between the outer race and the inner race. The at least one torque transmitting member selectively engages at least one of the outer race and the inner race to transfer torque from the inner race and, thus, the first shaft to the outer race such that the inner race and outer race rotate together.

The actuator is coupled to the inner race or the outer race. The actuator operably controls radial movement of the inner race or the outer race in the radial direction to provide selective lock-up of the inner race and the outer race. By controlling the radial movement of either the inner race or the outer race, the actuator adjusts the spacing of the inner race relative to the outer race at a location adjacent the at least one torque transmitting member. This allows the actuator to control whether or not the at least one torque transmitting member is engaged. In accordance with another aspect of the subject disclosure, at least one of the inner race and the outer race may include at least one cam that receives the at least one torque transmitting member. The at least one cam has a ramped surface configured to contact the at least one torque transmitting member.

Advantageously, the clutch assembly set forth in the subject disclosure eliminates the spinning losses associated with a disengaged wet clutch assembly and thus provide greater efficiency in comparison to conventional wet clutch assemblies. At the same time, the clutch assembly of the subject disclosure results in less noise, vibration, and harshness when compared to conventional dog clutch assemblies due to its ability to gradually transfer torque between the first shaft and the outer race, which may be rotatably coupled to a housing. This results in smoother shifts.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6C is another front cross-sectional view of the exemplary clutch assembly shown in FIGS. 6A and 6B where the inner race has been shifted counter-clockwise relative to its position in FIG. 6B;

FIG. 6D is another front cross-sectional view of the exemplary clutch assembly shown in FIGS. 6A-6C where the inner race has been shifted counter-clockwise relative to its position in FIG. 6C;

Figure 1:
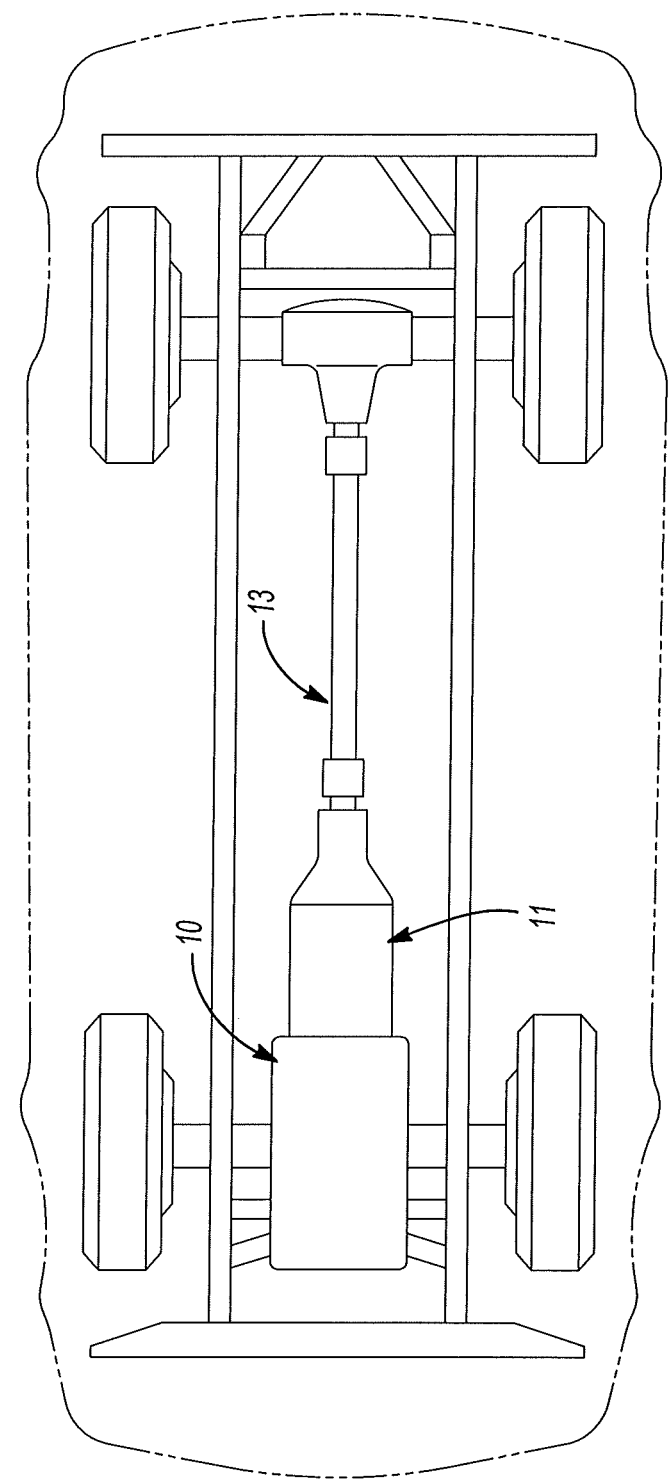
FIG. 1 is a schematic representation of a vehicle incorporating a transmission in accordance with the principles of the present disclosure.

FIG. 9 is a front cross-sectional view of another exemplary clutch assembly constructed in accordance with the principles of the present disclosure where the exemplary clutch assembly includes an eccentric first shaft; and FIG. 10 is a front cross-sectional view of another exemplary clutch assembly constructed in accordance with the principles of the present disclosure where the exemplary clutch assembly includes an eccentric outer race.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
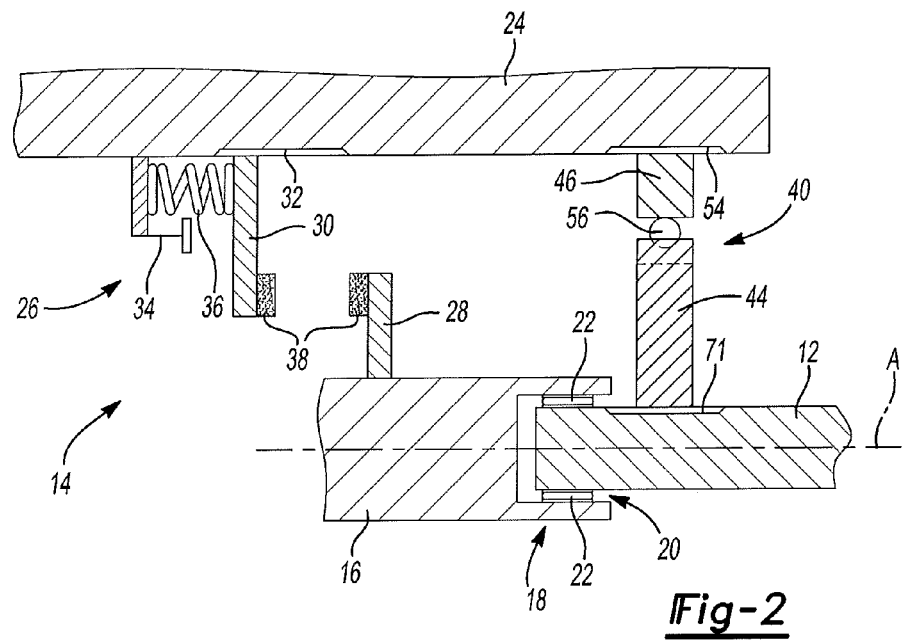
FIG. 2 is a side cross-sectional view of an exemplary clutch assembly constructed in accordance with the principles of the present disclosure and for use with the transmission shown in FIG. 1.

With reference to FIG. 1, a drive system for a vehicle is illustrated that includes a prime mover such as an engine 10, a transmission 11, and an output shaft 13. With reference to FIGS. 1 and 2, the transmission 11 may be driven by the engine 10 via a first shaft 12. The first shaft 12 may be rotatably coupled to the engine 10 and generally defines a central axis A extending along its center in a longitudinal direction. The transmission 11 may also include a series of clutch assemblies 14. While the transmission 11 may include any number of clutch assemblies 14, only one such clutch assembly 14 will be described and shown in detail. Identical clutch assemblies 14 may be used within the transmission 11 to establish a desired power flow through the transmission 11 and, thus, multiple gear ratios.

The transmission 11 may include a second shaft 16 that is concentrically aligned with the first shaft 12. Accordingly, the second shaft 16 also extends along the central axis A and is thus co-axial with the central axis A. The second shaft 16 may further include a hub portion 18 defining a cavity 20 therein that receives at least a portion of the first shaft 12. A bearing assembly 22 may be disposed within the cavity 20 of the hub portion 18 of the second shaft 16 between the first shaft 12 and the second shaft 16. The bearing assembly 22 operates to support the first shaft 12 within the cavity 20 of the hub portion 18 of the second shaft 16 while permitting independent rotation of the first shaft 12 and the second shaft 16. The second shaft 16 may be driven by the first shaft 12 when the clutch assembly 14 is in an engaged state and may remain motionless when the clutch assembly 14 is in a disengaged state, as will be described in detail below. Accordingly, the second shaft 16 may be rotatably coupled to the output shaft 13 of the transmission 11. The clutch assembly 14 is packaged within a housing 24. The housing 24 may be concentrically aligned with the first shaft 12 and the second shaft 16 such that the housing 24 is co-axial with the central axis A. Thus, the housing 24 may be disposed circumferentially about and radially spaced from at least portions of the first shaft 12 and the second shaft 16. As shown in FIG. 2, portions of both the first shaft 12 and the second shaft 16 may be disposed within the housing 24.

With reference to FIG. 2, the clutch assembly 14 may optionally include a wet clutch assembly 26. The wet clutch assembly 26 may include a first friction plate 28 and a second friction plate 30. The first and second clutch plates 28 and 30 may each have an annular shape and may extend around the center axis A. The first friction plate 28 may be rotatably coupled to the second shaft 16 and may rotate with the second shaft 16 about the central axis A. The second friction plate 30 may be rotatably coupled to and slidingly engaged with the housing 24. By way of example, and without limitation, the housing 24 may presents a plurality of splines 32 that engage the second friction plate 30 such that the second friction plate 30 may slide or translate longitudinally relative to the housing 24 in a direction that is substantially parallel to the central axis A.

The wet clutch assembly 26 may further include an actuator piston 34 and a biasing member 36 coupled to the second friction plate 30. The actuator piston 34 operates to slide the second friction plate 30 along the housing 24 in a first direction moving toward the first friction plate 28. The biasing member 36 operates to bias the second friction plate 30 in a second direction that is opposite to the first direction (i.e. the second direction is moving away from the first friction plate 28). Both the first direction and the second direction may extend substantially parallel to the central axis A in the longitudinal direction. Where the biasing member 36 is a spring, the biasing member 36 is stretched as the actuator piston 34 slides the second friction plate 30 in the first direction (i.e. toward the first friction plate 28). Accordingly, the biasing member 36 applies a biasing force to the second friction plate 30 in the second direction as the spring is stretched. The actuator piston 34 may be an annular piston and may be concentrically mounted within the housing 24. Thus, operation of the actuator piston 34 generally causes the second friction plate 30 to overcome the biasing force of the biasing member 36 and travel parallel to the central axis A in the first direction to eventually contact the first friction plate 28.

Frictional engagement between the first friction plate 28 and the second friction plate 30 can be accomplished by direct contact between the first and second friction plates 28, 30, and/or via a hydraulic fluid therebetween (i.e. fluid shear). Accordingly, the first friction plate 28 and the second friction plate 30 may have respective friction engagement surfaces 38 that contact one another in response to the actuator piston 34 sliding the second friction plate 30 in the first direction. While the wet clutch assembly 26 is described as including a first friction plate 28 and a second friction plate 30, the wet clutch assembly 26 may include a plurality of interleaved first friction plates and second friction plates (not shown).

Still referring to FIG. 2, the clutch assembly 14 generally includes a two-way over-running clutch 40 that controls slip between the first shaft 12 and the housing 24 in both rotational directions. Accordingly, the two-way over-running clutch 40 operates to eliminate drag-related losses associated with the wet clutch assembly 26. To appreciate this aspect of the subject disclosure, operation of the clutch assembly 14 in FIG. 2 will now be described in more detail. Generally, the first shaft 12 may be driven by the engine 10 in a first rotational direction. The two-way over-running clutch 40 has an engaged state and a disengaged state and provides variable slip and gradual lock-up between the first shaft 12 and the housing 24. In the engaged state, the two-way over-running clutch 40 prevents slip between the housing 24 and the first shaft 12 in a second rotational direction that is opposite the first rotational direction. Accordingly, in the engaged state, the first shaft 12 drives the housing 24 in the first rotational direction and the housing 24 cannot counter-rotate relative to the first shaft 12 or rotate in the first rotational direction at a slower rotational speed relative to the first shaft 12. At the same time, the two-way over-running clutch 40 in the engaged state allows the housing 24 to over-run the first shaft 12, meaning that the housing 24 is free to rotate in the first rotational direction at a rotational speed that exceeds the rotational speed of the first shaft 12. As will be explained in greater detail below, the two-way over-running clutch 40 may be controlled such that the two-way over-running clutch 40 drives rotation of the housing 24 in the second direction when the two-way over-running clutch 40 is in the engaged state. In the disengaged state, the two-way over-running clutch 40 permits free rotation of the housing 24 with respect to the first shaft 12 in either rotational direction and at any rotational speed. The two-way over-running clutch 40 also offers an intermediate state where some slip is permitted between the housing 24 and the first shaft 12 such that the housing 24 may be permitted to rotate in the first rotational direction or the second rotational direction at a rotational speed that is less than the rotational speed of the first shaft 12.

During operation of the clutch assembly 14 in FIG. 2, the two-way over-running clutch 40 may be switched from the disengaged state to the engaged state. When this occurs, the two-way over-running clutch 40 eliminates relative rotation between the first shaft 12 and the housing 24 and provides an efficient torque transmission mechanism between the first shaft 12 and the second shaft 16. Frictional losses and inefficiencies caused by any drag associated with rotating the first friction plate 28 or the second friction plate 30 of the wet clutch assembly 26 are eliminated. Rotation of the housing 24 via the two-way over-running clutch 40 produces relative rotation of the second friction plate 30 with respect to the first friction plate 28. Upon actuation of the actuator piston 34, the second friction plate 30 moves relative to the housing 24, as described above, and into frictional engagement with the first friction plate 28. At this point, the two-way over-running clutch 40 and the wet clutch assembly 26 are in the engaged state and the second shaft 16 rotates with the first shaft 12 via the housing 24.

The second shaft 16 may be uncoupled from the first shaft 12 by releasing the actuator piston 34 to once again permit the first shaft 12 to rotate relative to the second shaft 16 without causing rotation of the second shaft 16. Namely, releasing the actuator piston 34 uncouples the second shaft 16 from the housing 24. Accordingly, the first shaft 12 is permitted to rotate relative to the second shaft 16 when the wet clutch assembly 26 is in the disengaged state, as the housing 24 does not directly transmit a rotational force from the first shaft 12 to the second shaft 16. The two-way over-running clutch 40 may also be switched from the engaged state to the disengaged state such that torque is not transmitted between the housing 24 and the first shaft 12. This eliminates drag-related losses associated with spinning the housing 24 and the second friction plate 30 when the wet clutch assembly 26 is in the disengaged state, which improves the efficiency of the clutch assembly 14.

Figure 3:
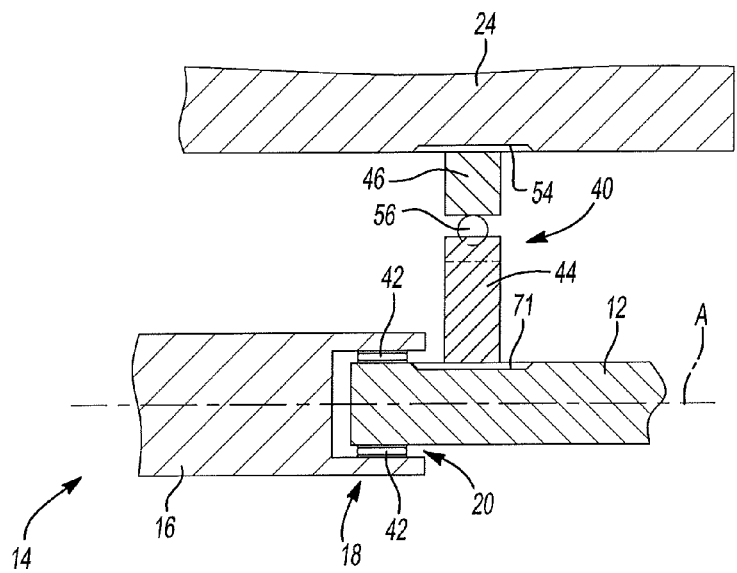
FIG. 3 is a side cross-sectional view of another exemplary clutch assembly constructed in accordance with the principles of the present disclosure and for use with the transmission shown in FIG. 1.

With reference to FIG. 3, the two-way over-running clutch 40 may replace the wet clutch assembly 26 altogether because in the intermediate state, the two-way over-running clutch 40 permits limited slip. In this configuration, the two-way over-running clutch 40 is connected between the first shaft 12 and the housing 24 and the first shaft 12 is rotatably coupled to the second shaft 16 via coupling 42. As a result, the first shaft 12 rotates with the second shaft 16. Of course additional configurations of the transmission 11 and the clutch assembly 14 are possible while maintaining the utility of the two-way over-running clutch 40. The exemplary variations shown in FIGS. 2 and 3 are therefore not limiting and alternative configurations are considered within the scope of the subject disclosure. The structure of the two-way over-running clutch 40 will now be explained in greater detail.

Figures 4A, 4B:
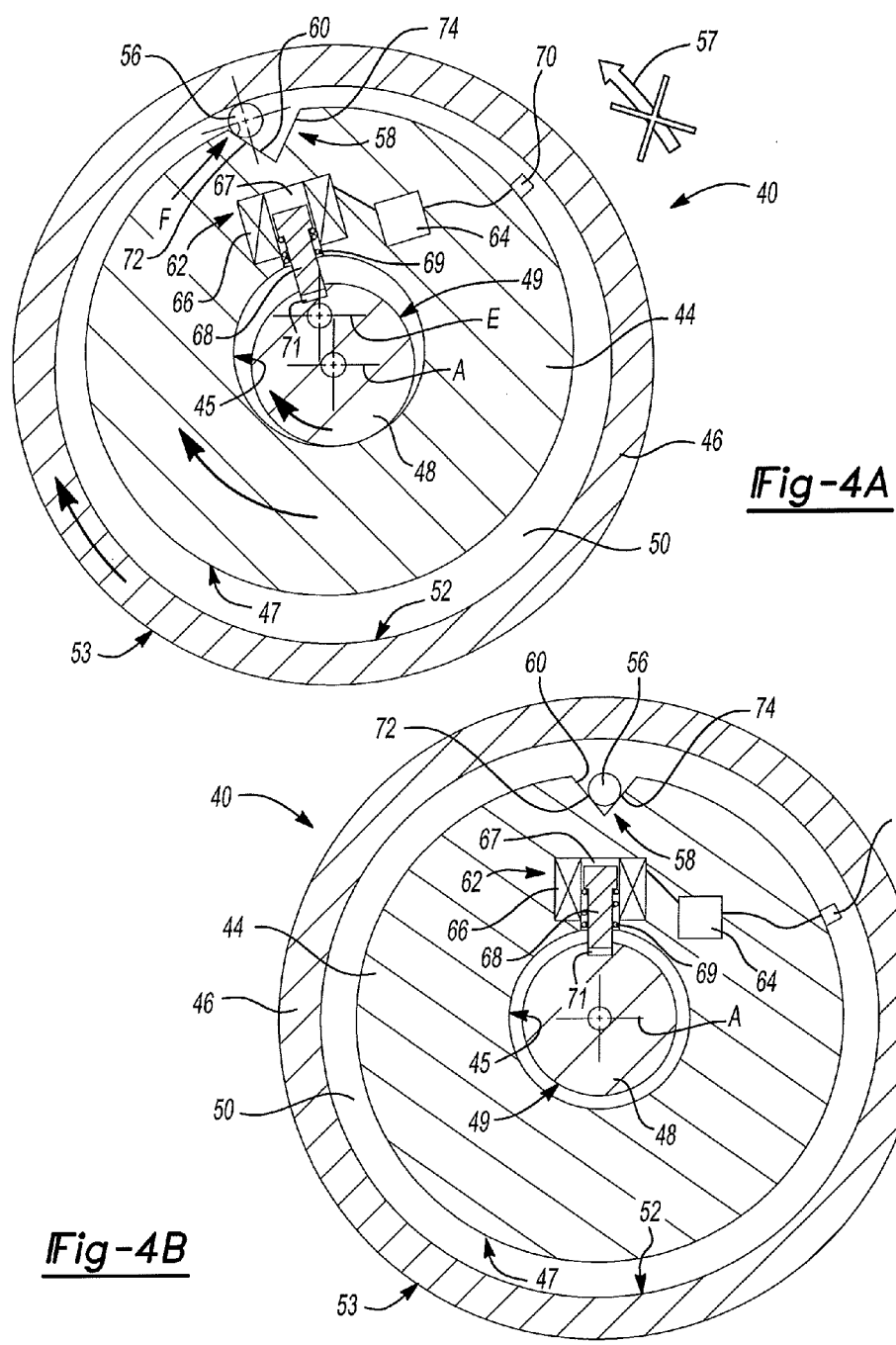
FIG. 4A is a front cross-sectional view of another exemplary clutch assembly constructed in accordance with the principles of the present disclosure where an inner race is shown in an eccentric position.
FIG. 4B is another front cross-sectional view of the exemplary clutch assembly shown in FIG. 4A where the inner race is shown in a concentric position.
Figure 4C:
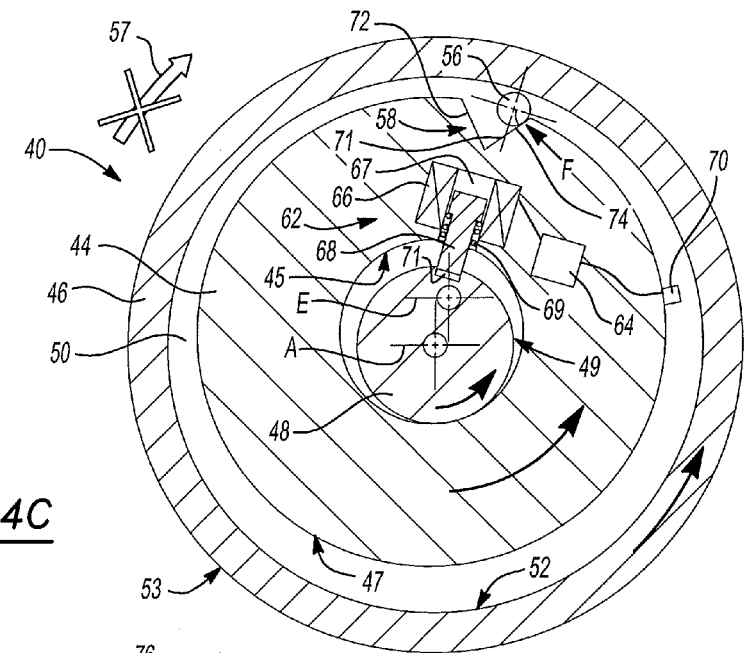
FIG. 4C is another front cross-sectional view of the exemplary clutch assembly shown in FIGS. 4A and 4B where the inner race is shown in another eccentric position.

Referring to FIGS. 4A-C, the two-way over-running clutch 40 includes an inner race 44 and an outer race 46 that is disposed radially outwardly of the inner race 44. The inner race 44 includes an interior surface 45 and an exterior surface 47. Both the interior surface 45 and the exterior surface 47 of the inner race 44 are cylindrical in shape. The inner race 44 of the two-way over-running clutch 40 may be rotatably coupled to a first shaft 48 such that the inner race 44 rotates with the first shaft 48 when power is supplied to the first shaft 48 via the engine 10. The first shaft 48 includes an exterior surface 49. The exterior surface 49 of the first shaft 48 is also cylindrical in shape. The inner race 44 is disposed radially about the first shaft 48 such that the interior surface 45 of the inner race 44 and the exterior surface 49 of the first shaft 48 face one another. As shown in FIGS. 2 and 3, either of the first shaft 12 or the second shaft 16 may be the first shaft 48 of the two-way over-running clutch 40 depending on the arrangement of the clutch assembly 14. The inner race 44 is moveable relative to the first shaft 48 between a concentric position (FIG. 4B) and one or more eccentric positions (FIGS. 4A and 4C). Spatially, the inner race 44 is concentrically aligned with the first shaft 48 and, thus, the central axis A in the concentric position. Conversely, the inner race 44 is eccentrically aligned with the first shaft 48 in the eccentric position. In other words, the inner race 44 is centered about an eccentric axis E when the inner race 44 is in the eccentric position. The eccentric axis E is parallel to the central axis A and is radially spaced from the central axis A. Accordingly, an off-set gap 50 is created between a portion of the inner race 44 and the outer race 46. This off-set gap 50 may have a crescent shape as shown in FIGS. 4A and 4C. As the position of inner race 44 is adjusted as explained below, the angular position of the off-set gap 50 in relation to the outer race 46 will change.

The outer race 46 of the two-way over-running clutch 40 may be rotatably coupled to the housing 24 such that rotation of the outer race 46 rotates with the housing 24. Spatially, the outer race 46 may be concentrically aligned with the first shaft 48 and, thus, the central axis A. The outer race 46 has an interior surface 52 and an exterior surface 53. Both the interior surface 51 and the exterior surface 53 of the outer race 46 are cylindrical in shape. Because the outer race 46 is disposed about the inner race 44, the interior surface 52 of the outer race 46 and the exterior surface 47 of the inner race 44 face one another. As shown in FIGS. 2 and 3, the exterior surface 53 of the outer race 46 abuts the housing 24. The outer race 46 may be rotatably coupled to the housing 24 via splines 54 disposed along the housing 24 and the exterior surface 53 of the outer race 46.

The two-way over-running clutch 40 generally includes one or more torque transmitting members 56 disposed between the outer race 46 and the inner race 44. The torque transmitting member 56 operates to engage the interior surface 52 of the outer race 46 and the exterior surface 47 of the inner race 44 to transfer torque from the inner race 44 to the outer race 46. As will be explained in greater detail below, the torque transmitting member 56 can therefore selectively couple rotation of the inner race 44 and the outer race 46 and therefore rotation of the first shaft 48 and the housing 24.

The inner race 44 may have one or more cams 58 disposed along the exterior surface 49 of the inner race 44 that receive the torque transmitting member(s) 56. The cam 58 includes a ramped surface 60 that can contact the torque transmitting member 56 and thereby apply a contact force F to the torque transmitting member 56. The contact force F thus biases the torque transmitting member 56 to a first position where the torque transmitting member 56 contacts the interior surface 52 of the outer race 46. Generally, the torque transmitting member 56 may be sized such that the torque transmitting member 56 is larger than the distance between the exterior surface 49 of the inner race 44 and the interior surface 52 of the outer race 44. This keeps the torque transmitting member 56 located in the cam 58 and prevents the torque transmitting member 56 from moving out from the cam 58 and into the space between the exterior surface 49 of the inner race 44 and the interior surface 52 of the outer race 44.

The two-way over-running clutch 40 may further include an inner race actuator 62 that is coupled to the inner race 44. The inner race actuator 62 controls movement of the inner race 44 between the concentric position and the eccentric position(s) to provide selective lock-up of the inner race 44 relative to the outer race 46. The inner race actuator 62 locks up the inner race 44 relative to the outer race 46 by engaging the torque transmitting member 56 with the interior surface 52 of the outer race 46. Control of the inner race actuator 62 may be active or passive. Examples of such active and passive control will be explained in more detail below. Where control of the inner race actuator 62 is active, the clutch assembly 14 may further include a controller 64 that is connected in communication with the inner race actuator 62. The controller 64 therefore provides active control of the inner race actuator 62 and movement of the inner race 44 relative to the outer race 46.

Still referring to FIGS. 4A-C, the inner race actuator 62 is shown as a solenoid including a coil 66 that receives electricity from the controller 64. The coil 66 is positioned adjacent an actuator cavity 67 that extends radially into the inner race 44 from the interior surface 45 of the inner race 44. An actuator member 68 extends radially within the actuator cavity 67 and translates between a retracted position (FIG. 4B) and an extended position (FIGS. 4A and 4C) in response to electricity flow through the coil 66. Thus, the coil 66 may push and pull the actuator member 68 to move the actuator member 68 between the retracted position and the extended position or the coil 66 may push the actuator member 68 toward the extended position while a return spring 69 biases the actuator member 68 back toward the retracted position. In configurations where the return spring 69 is used, the return spring 69 may extend annularly about the actuator member 68 within the actuator cavity 67 and may extend between complimentary shoulders formed in the inner race 44 and the actuator member 68. A sensor 70 may optionally be connected to the controller 64 such as a pressure sensor or a thermocouple. The sensor 70 thus operates to measure pressure or temperature of a fluid contained within the housing 24 and relays this information to the controller 64 where it is processed and used in controlling the inner race actuator 62. By way of non-limiting example, the controller 64 may control the inner race actuator 62 to move the inner race 44 to one of the eccentric positions in response to a rise in pressure or temperature measured by the sensor 70. The first shaft 48 includes one or more recesses 71 that extend radially into the first shaft 48 from the exterior surface 49 of the first shaft 48. In FIGS. 4A-C, a single recess 71 is illustrated and the actuator member 68 extends radially from the actuator cavity such that a portion of the actuator member 68 is permanently received in the recess 71. In other words, a portion of the actuator member 68 is disposed in the recess 71 when the actuator member 68 is in both the retracted position and the extended position. In this way, the inner race actuator 62 couples rotation of the first shaft 48 with the inner race 44 via the actuator member 68.

The torque transmitting member 56 shown in FIGS. 4A-C is a ball 56 that moves along the ramped surface 60 of cam 58 between a free position where the ball 56 is free to spin with respect to the outer race 46 and the inner race 44 (as illustrated in FIG. 4B) and a locked position where the ball 56 is squeezed between the ramped surface 60 of the cam 58 and the interior surface 52 of the outer race 46 (as illustrated in FIGS. 4A and 4C) to prevent the outer race 46 from rotating in a direction 57 opposite from a rotating direction of the inner race 44. Prior to reaching the locked position, the ball 56 may reach a sliding position where the ball 56 contacts both the ramped surface 60 of the cam 58 and the interior surface 52 of the outer race 46, but is not sufficiently squeezed therebetween to lock rotation of the outer race 46 with rotation of the inner race 44. Accordingly, the ball 56 in the sliding position transmits torque between the inner race 44 and the outer race 46 by frictional sliding. Although the ball 56 may be made of a wide range of materials, by way of example and without limitation, the ball 56 may be made of a metal or a metal alloy.

The cam 58 shown in FIGS. 4A-C is a bi-directional cam 58. The ramped surface 60 of the bi-directional cam 58 defines a valley 71 (FIG. 4C) between two opposing inclines 72, 74. The two opposing inclines 72, 74 include a first incline 72 that forces the torque transmitting member 56 against the interior surface 52 of the outer race 46 in response to counter-clockwise rotation of the outer race 46 with respect to the inner race 44 and a second incline 74 that forces the torque transmitting member 56 against the interior surface 52 of the outer race 46 in response to clockwise rotation of the outer race 46 with respect to the inner race 44.

As shown in FIG. 4A, the inner race actuator 62 has moved the inner race 44 to the eccentric position. Counter-clockwise rotation of the outer race 46 causes the torque transmitting member 56 to engage both the first incline 72 of the bi-directional cam 58 and the interior surface 52 of the outer race 46. Similarly, when the inner race 44 rotates in a clockwise direction as shown in FIG. 4A, the ball 56 moves towards the interior surface 52 of the outer race 46 by centrifugal force against the first incline 72 because rotation of the outer race 46 lags behind rotation of the inner race 44 until the ball 56 is squeezed between the first incline 72 of the cam 58 and the interior surface 52 of the outer race 46. Accordingly, in FIG. 4A, the inner race 44 drives the outer race 46 in clockwise rotation. Thus, when the ball 56 is squeezed between the first incline 72 of the cam 58 and the interior surface 52 of the outer race 46, the outer race 46 cannot rotate in the counter-clockwise direction nor can the outer race 46 rotate in the clockwise direction at a rotational speed that is slower than the rotational speed of the inner race 44. However, the outer race 46 can over-run the inner race 44 by rotating in the clockwise direction at a rotational speed that exceeds the rotational speed of the inner race 44.

As shown in FIG. 4B, the inner race actuator 62 has moved the inner race 44 to the concentric position such that the inner race is in a disengaged state where the torque transmitting member 56 does not engage the interior surface 52 of the outer race 46. Accordingly, in FIG. 4B, the outer race 46 is free to rotate in both the counter-clockwise and clockwise directions at any rotational speed.

As shown in FIG. 4C, the inner race actuator 62 has moved the inner race 44 to the eccentric position. Clockwise rotation of the outer race 46 causes the torque transmitting member 56 to engage both the second incline 74 and the interior surface 52 of the outer race 46. Similarly, when the inner race 44 rotates in a counter-clockwise direction as shown in FIG. 4C, the ball 56 moves towards the interior surface 52 of the outer race 46 by centrifugal force against the second incline 74 because rotation of the outer race 46 lags behind rotation of the inner race 44 until the ball 56 is squeezed between the second incline 74 of the cam 58 and the interior surface 52 of the outer race 46. Accordingly, in FIG. 4C, the inner race 44 drives the outer race 46 in counter-clockwise rotation. Thus, when the ball 56 is squeezed between the second incline 74 of the cam 58 and the interior surface 52 of the outer race 46, the outer race 46 cannot rotate in the clockwise direction nor can the outer race 46 rotate in the counter-clockwise direction at a rotational speed that is slower than the rotational speed of the inner race 44. However, the outer race 46 can over-run the inner race 44 by rotating in the counter-clockwise direction at a rotational speed that exceeds the rotational speed of the inner race 44.

Figure 5:
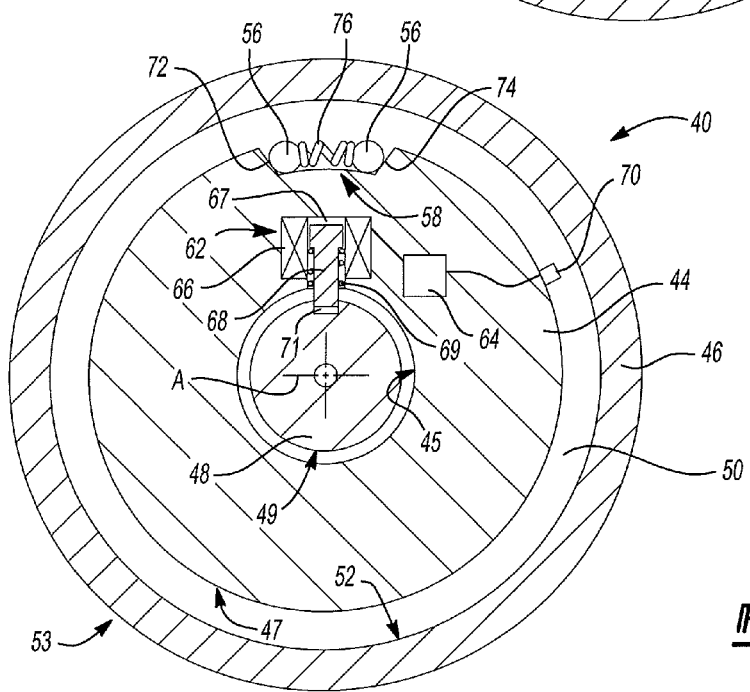
FIG. 5 is a front cross-sectional view of another exemplary clutch assembly constructed in accordance with the principles of the present disclosure.

Referring to FIG. 5, the one or more torque transmitting members 56 include multiple torque transmitting members 56 and the at least one bi-directional cam 58 may be elongated to receive the multiple torque transmitting members 56. Further, an elastic member 76 such as a spring may optionally be provided between adjacent torque transmitting members 56 that biases the torque transmitting members 56 towards the first and second inclines 72, 74 respectively. Accordingly, the elastic member 76 opposes the contact force F that is applied to the torque transmitting members 56 by the first and second inclines 72, 74 of the at least one cam 58. Otherwise, the two-way over-running clutch 40 shown in FIG. 5 operates in a similar way to that described above and shown in FIGS. 4A-C.

Referring now to FIGS. 6A-D, the inner race actuator 62 shown is a hydraulic actuator where the actuator cavity 67 receives fluid from the controller 64. The actuator member 68 translates between the retracted position and the extended position in response to fluid pressure within the actuator cavity 67.

Figure 6A:
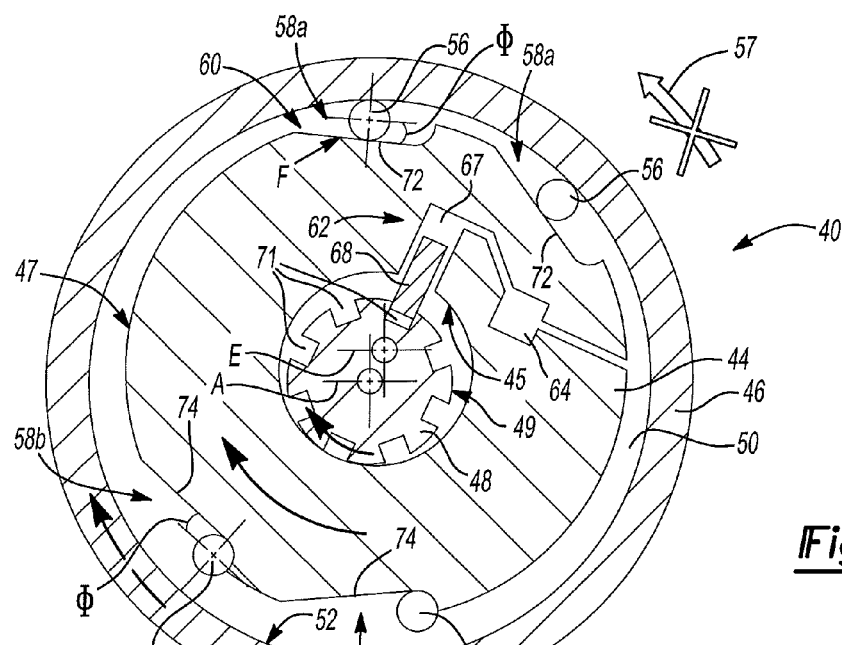
FIG. 6A is a front cross-sectional view of another exemplary clutch assembly constructed in accordance with the principles of the present disclosure.

The first shaft 48 includes a plurality of recesses 71 that are circumferentially spaced about the exterior surface 49 of the first shaft 49. Each recess 71 extends radially into the first shaft 48 from the exterior surface 49 of the first shaft 48 and is sized and shaped to receive the actuator member 68. In the extended position (FIGS. 6A, 6B, and 6D), the actuator member 68 extends into one of the recesses 71, but the actuator member 68 is removed from the recesses 71 in the retracted position (FIG. 6C). Accordingly, the actuator member 68 only couples rotation of the inner race 44 and the first shaft 48 when the actuator member 68 is in the extended position. In the retracted position, the first shaft 48 may rotate relative to inner race 44. By controlling the timing of when the actuator member 68 is moved from the retracted position to the extended position, the inner race actuator 62 selectively controls which recess 71 of the plurality of recesses 71 the actuator member 68 is extended into. This varies the angular position of the inner race 44 relative to the first shaft 48. As will be explained in greater detail below, this allows the inner race actuator 62 to adjust the lock-up sensitivity (i.e. slip) of the two-way over-running clutch 40. It should further be appreciated that the controller 64 may control the timing of when the actuator member 68 is moved from the retracted position to the extended position based upon an algorithm and/or based upon measurements from the sensor 70. The one or more torque transmitting members 56 are shown as multiple cylindrical rollers 56 that move along the ramped surface 60 of the one or more cams 58 between a free position where the cylindrical rollers 56 are free to spin with respect to the outer race 46 and the inner race 44 and a locked position where the cylindrical rollers 56 are squeezed between the ramped surface 60 of the cams 58 and the interior surface 52 of the outer race 46 to prevent the outer race 46 from rotating in a direction 57 opposite from the rotating direction of the inner race 44.

In FIGS. 6A-D, the one or more cams 58 include a first pair of directional cams 58a and a second pair of directional cams 58b that are circumferentially spaced about the exterior surface 47 of the inner race 44. According to this configuration, the ramped surface 60 of each of the first pair of directional cams 58a defines the first incline 72, which forces the one or more torque transmitting members 56 to resist counter-clockwise rotation of the outer race 46 with respect to the inner race 44. Similarly, the ramped surface 60 of each of the second pair of directional cams 58b defines the second incline 74, which forces the torque transmitting members 56 to resist clockwise rotation of the outer race 46 with respect to the inner race 44.

In a similar fashion to the operation of the inner race actuator 62 described above, the inner race actuator 62 shown in FIGS. 6A-D controls lock-up of the two-way over-running clutch 40 by moving the inner race 44 between the concentric position and one or more eccentric positions. By switching the inner race 44 between multiple eccentric positions (FIG. 6A versus 6D), the inner race actuator 62 selectively controls whether the first and second pair of directional cams 58a, 58b are engaged. Meanwhile, the inner race actuator 62 controls the lock-up sensitivity of the two-way over-running clutch 40 by varying the angular position of the inner race 44 to change an angle of incidence $\varphi$ of the first and second inclines 72, 74 with respect to the torque transmitting members 56. In other words, the inner race actuator 62 can be used to adjust the steepness of the first and second inclines 72, 74 by varying the angular position of the inner race 44 relative to the outer race 46.

As shown in FIG. 6A, the inner race actuator 62 has moved the inner race 44 to one of the eccentric positions. Counter-clockwise rotation of the outer race 46 relative to the inner race 44 causes the torque transmitting members 56 to engage the first incline 72 of the first directional cams 58a and the interior surface 52 of the outer race 46. Further, it should be appreciated that in FIG. 6A, the inner race actuator 62 has adjusted the angular position of the inner race 44 such that only the first directional cams 58a are engaged and so that the angle of incidence $\varphi$ of the first incline 72 is large (i.e. steep). In effect, this decreases the steepness of the first incline 72 from the perspective of the torque transmitting members 56. Accordingly, lock-up sensitivity is reduced and greater slip between the outer race 46 and the inner race 44 is allowed because the outer race 46 has more of a tendency to slide against the torque transmitting members 56 rather than squeeze the torque transmitting members 56 and thus lock-up. Stated another way, the first incline 72 applies less contact force F to the torque transmitting members 56 when the angle of incidence $\varphi$ is decreased and thus permits greater slip between the outer race 46 and the inner race 44 before lock-up. Accordingly, in FIG. 6A, the inner race 44 drives the outer race 46 in clockwise rotation. The outer race 46 cannot rotate in the counter-clockwise direction nor can the outer race 46 rotate in the clockwise direction at a rotational speed that is slower than the rotational speed of the inner race 44. However, the outer race 46 can over-run the inner race 44 by rotating in the clockwise direction at a rotational speed that exceeds the rotational speed of the inner race 44.

Figure 6B:
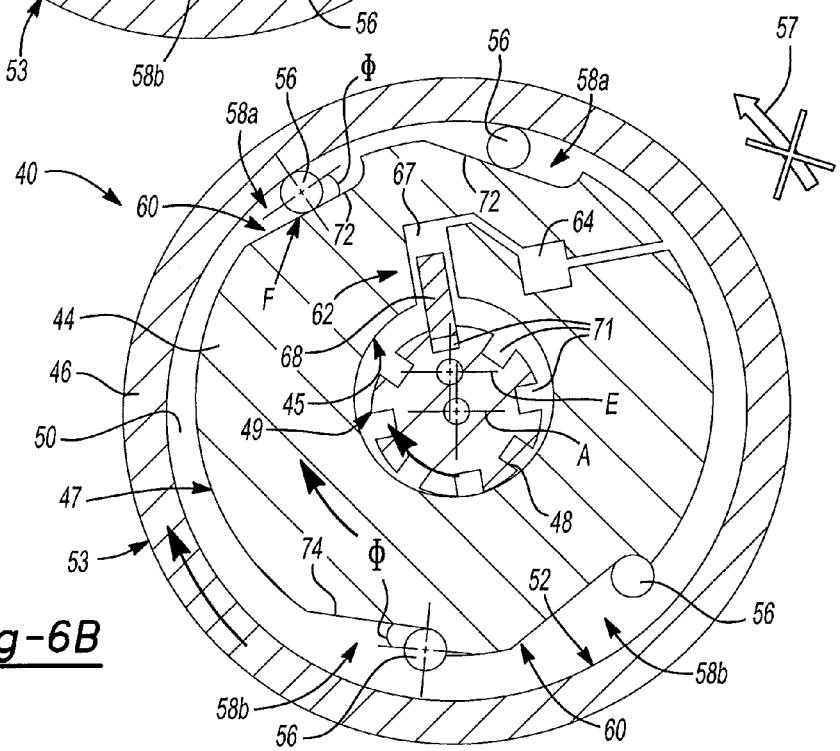
FIG. 6B is another front cross-sectional view of the exemplary clutch assembly shown in FIG. 6A where the inner race has been shifted counter-clockwise relative to its position in FIG. 6A.

As shown in FIG. 6B, the inner race actuator 62 has again moved the inner race 44 to one of the eccentric positions. Counter-clockwise rotation of the outer race 46 relative to the inner race 44 causes the torque transmitting members 56 to engage the first incline 72 of the first directional cams 58a. It should also be appreciated, the second directional cams 58b are not engaged. However, in FIG. 6B, the inner race actuator 62 has set the angular position of the inner race 44 such that the angle of incidence $\varphi$ of the first incline 72 is small (i.e. shallow). In effect, this increases the steepness of the first incline 72 from the perspective of the torque transmitting members 56. Accordingly, lock-up sensitivity is increased and less slip between the outer race 46 and the inner race 44 is allowed because the outer race 46 has more of a tendency to squeeze the torque transmitting members 56 and thus lock-up. This occurs because the first incline 72 applies more contact force F to the torque transmitting members 56 when the angle of incidence $\varphi$ is increased and, thus, permits less slip between the outer race 46 and the inner race 44 before lock-up. The reverse is true for using the inner race actuator 62 to adjust angle of incidence $\varphi$ of the second incline 74 where the inner race 44 is rotating counter-clockwise as shown in FIG. 4C. Accordingly, in FIG. 6B, the inner race 44 drives the outer race 46 in clockwise rotation, but some slip between the outer race 46 and the inner race 44 may be permitted. Although the outer race 46 cannot rotate in the counter-clockwise direction, the outer race 46 may rotate in the clockwise direction at a rotational speed that is slower than the rotational speed of the inner race 44. Again, the outer race 46 is still free to over-run the inner race 44 by rotating in the clockwise direction at a rotational speed that exceeds the rotational speed of the inner race 44.

As shown in FIG. 6C, the inner race actuator 62 has moved the inner race 44 to the concentric position such that the inner race 44 is in a disengaged state. Accordingly, in FIG. 6C, the outer race 46 is free to rotate in both the counter-clockwise and clockwise directions at any rotational speed.

As shown in FIG. 6D, the inner race actuator 62 has moved the inner race 44 to another one of the eccentric positions such that clockwise rotation of the outer race 46 relative to the inner race 44 causes the torque transmitting members 56 to engage the second incline 74 of the second directional cams 58b. Accordingly, in FIG. 6D, the inner race 44 drives the outer race 46 in counter-clockwise rotation. The outer race 46 cannot rotate in the clockwise direction nor can the outer race 46 rotate in the counter-clockwise direction at a rotational speed that is slower than the rotational speed of the inner race 44. However, the outer race 46 can over-run the inner race 44 by rotating in the counter-clockwise direction at a rotational speed that exceeds the rotational speed of the inner race 44.

Figure 7A:
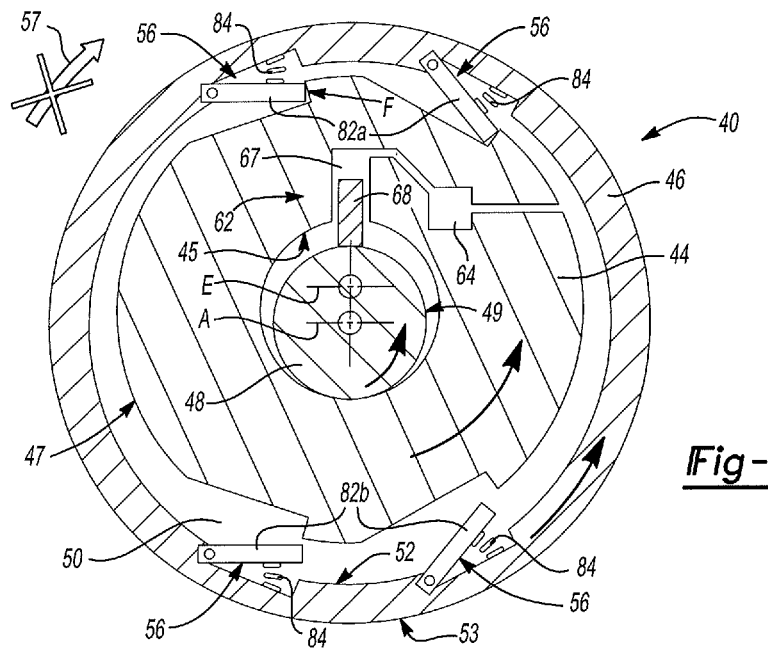
FIG. 7A is a front cross-sectional view of another exemplary clutch assembly constructed in accordance with the principles of the present disclosure where the inner race is shown in an eccentric position.
Figure 7B:
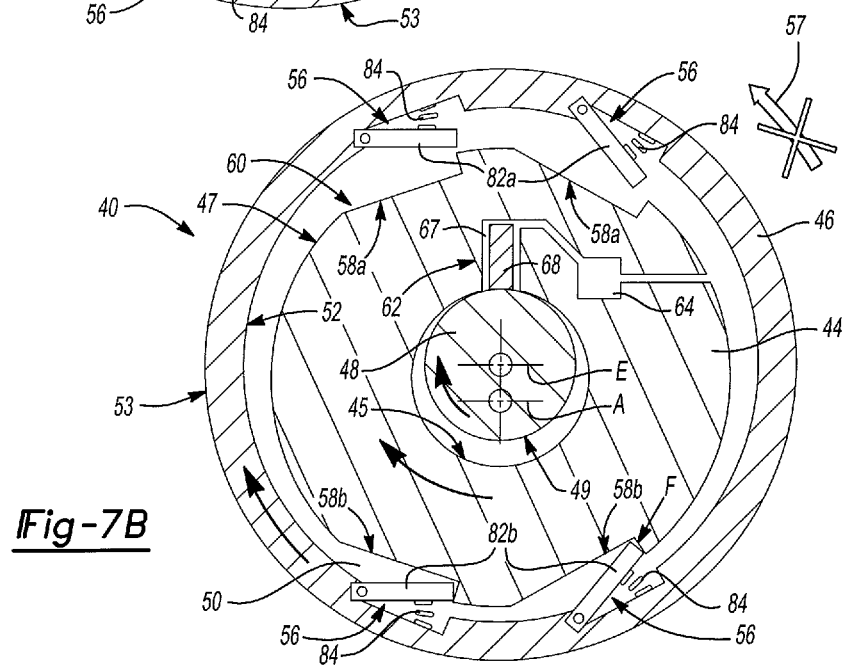
FIG. 7B is another front cross-sectional view of the exemplary clutch assembly shown in FIG. 7A where the inner race is shown in another eccentric position.

With reference to FIGS. 7A and 7B, the one or more torque transmitting members 56 may be multiple ratchet assemblies each including a ratchet arm 82 that is pivotally connected to the outer race 46 and a resilient member 84 extending between the ratchet arm 82 and the outer race 46 that biases the ratchet arm 82 toward the inner race 44. The ratchet arm 82 has a shape that freely slides over the ramped surface 60 of the cams 58 when the outer race 46 is rotating in one rotational direction with respect to the inner race 44 and that locks into the cams 58 when the outer race 46 is rotating in another rotational direction with respect to the inner race 44. In FIGS. 7A and 7B, the cams 58 include a first pair of directional cams 58a and a second pair of directional cams 58b that are circumferentially spaced about the inner race 44. The multiple ratchet assemblies are arranged in opposing sets so that there are ratchet arms 82a that pivot with counter-clockwise rotation of the outer race 46 and ratchet arms 82b that pivot with clockwise rotation of the outer race 46.

As shown in FIG. 7A, the inner race 44 is in one of the eccentric positions and the ramped surface 60 of the first directional cams 58a forces the ratchet arms 82a to resist clockwise rotation of the outer race 46 with respect to the inner race 44. As shown in FIG. 7B, the inner race 44 is in another one of the eccentric positions and the ramped surface 60 of the second directional cams 58b forces the ratchet arms 82b to resist counter-clockwise rotation of the outer race 46 with respect to the inner race 44. The inner race actuator 62 controls movement of the inner race 44 between the concentric position and the one or more eccentric positions and thus controls which of the first and second directional cams 58a, 58b are engaged. Accordingly, the inner race actuator 62 sets the over-running direction of the two-way over-running clutch 40. Further, in FIGS. 7A and 7B the actuator member 68 is fixedly connected to the first shaft 48 such that the actuator member 68 couples rotation of the first shaft 48 and the inner race 44. By way of example and without limitation, the actuator member 68 may be integral with the first shaft 48 or may be attached to the first shaft 48 by welding or an adhesive.

Figure 8:
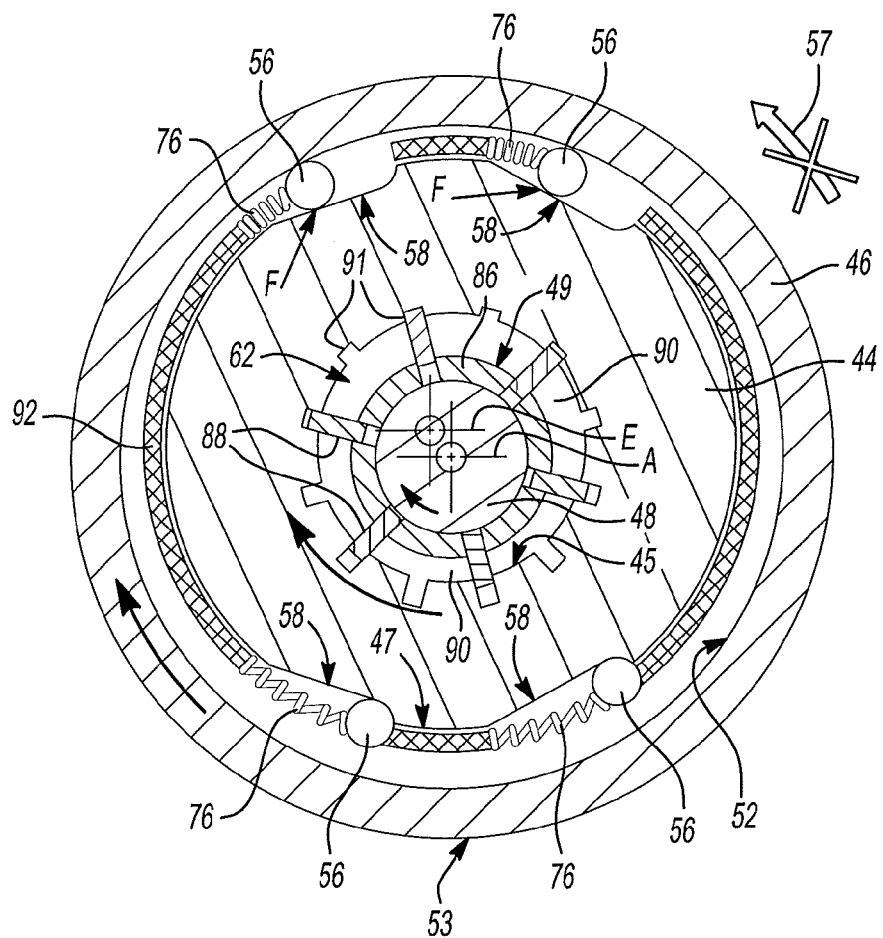
FIG. 8 is a front cross-sectional view of another exemplary clutch assembly constructed in accordance with the principles of the present disclosure where a retainer is shown that maintains the position of several torque transmitting members.

With reference now to FIG. 8, the inner race actuator 62 may include a rotor 86 that is rotatably coupled to the first shaft 48 and a plurality of vanes 88 that extend from the rotor 86. The plurality of vanes 88 move radially inwardly and radially outwardly with respect to the rotor 86 and contact the inner race 44. Accordingly, the plurality of vanes 88 form variable displacement chambers 90 between the rotor 86 and the inner race 44 that pump fluid. Thus, the rotor 86 and the plurality of vanes 88 of the inner race actuator 62 operate to passively control movement of the inner race 44 between the concentric position and the one or more eccentric positions based on fluid pressure within the variable displacement chambers 90. For example, the inner race 44 may move to the concentric position when the fluid pressure in all of the variable displacement chambers 90 is the same and the inner race 44 may move to one of the eccentric positions when the fluid pressure in the variable displacement chambers 90 on one side of the inner race 44 is greater than the fluid pressure in the variable displacement chambers 90 on an opposite side of the inner race 44 (as shown in FIG. 8). The inner race 44 may have a plurality of recesses 91 that extend into the inner race 44 from the interior surface 45 of the inner race 44. The plurality of vanes 88 may extend into the recesses 91 to rotatably couple the first shaft 48 and the inner race 44. Also shown in FIG. 8, the two-way over-running clutch 40 may optionally include a retainer 92 disposed between the inner race 44 and the outer race 46 that holds the torque transmitting members 56 in alignment with the cams 58. When the retainer 92 is provided, the elastic member 76 may optionally be disposed between the retainer 92 and each of the torque transmitting members 56. Accordingly, the elastic member 76 biases the torque transmitting members 56 towards the cams 58 and opposes the contact force F that is applied to the torque transmitting members 56 by the cams 58.

As shown in FIG. 9, the two-way over-running clutch 40 may alternatively include an eccentric first shaft 48. The inner race 44 follows the eccentric first shaft 48 while the outer race 46 is centered about the central axis A. In this configuration, the eccentric first shaft 48 is centered about the eccentric axis E instead of being centered about the central axis A. Accordingly, the first shaft 48 may include a counter-weight 94 to balance the eccentricity of the rotational mass of the eccentric first shaft 48. The inner race 44 of the two-way over-running clutch 40 may be rotatably coupled to the eccentric first shaft 48 such that the inner race 44 rotates with the eccentric first shaft 48 when power is supplied to the eccentric first shaft 48 via the engine 10. The eccentricity of the eccentric first shaft 48 thus provides an off-set gap 50 between a portion of the inner race 44 and the outer race 46.

Like in the previous configurations, the torque transmitting member 56 is disposed between the outer race 46 and the inner race 44. The torque transmitting member 56 operates to engage the interior surface 52 of the outer race 46 and the exterior surface 47 of the inner race 44 to transfer torque from the inner race 44 to the outer race 46. The cam 58 of the inner race 44 receives the torque transmitting member 56. The cam 58 includes a ramped surface 60 that can contact the torque transmitting member 56 and thereby apply a contact force F to the torque transmitting member 56. The inner race actuator 62 is coupled to the inner race 44 and controls lock-up of the two-way over-running clutch 40 by moving the inner race 44 relative to the eccentric first shaft 48 and, thus, the outer race 46 between the concentric position and one or more eccentric positions. As stated above, control of the inner race actuator 62 may be active or passive.

Still referring to FIG. 9, actuation of the inner race actuator 62 controls whether the torque transmitting member 56 engages the first or second inclines 72, 74 of the cam 58 and the interior surface 52 of the outer race 46. In FIG. 9, the inner race actuator 62 has moved the inner race 44 to one of the eccentric positions such that counter-clockwise rotation of the outer race 46 causes the torque transmitting member 56 to engage the first incline 72 and the interior surface 52 of the outer race 46. Accordingly, the inner race 44 drives the outer race 46 in clockwise rotation. The outer race 46 cannot rotate in the counter-clockwise direction nor can the outer race 46 rotate in the clockwise direction at a rotational speed that is slower than the rotational speed of the inner race 44. However, the outer race 46 can over-run the inner race 44 by rotating in the clockwise direction at a rotational speed that exceeds the rotational speed of the inner race 44.

As shown in FIG. 10, the two-way over-running clutch 40 may alternatively include an eccentric outer race 46 that is fixed such that the eccentric outer race 46 remains stationary and does not rotate. In this configuration, the eccentric outer race 46 may be used as a clutch-brake replacement such that the two-way over-running clutch 40 provides selectable braking of the first shaft 48 in either direction of rotation. In this configuration, the first shaft 48 is centered about the central axis A. At the same time, the eccentric outer race 44 is centered about the eccentric axis E. The inner race 44 of the two-way over-running clutch 40 may be rotatably coupled to the first shaft 48 such that the inner race 44 rotates with the first shaft 48 when power is supplied to the first shaft 48 via the engine 10. The eccentricity of the eccentric outer race 46 thus provides an off-set gap 50 between a portion of the inner race 44 and a portion of the eccentric outer race 46.

Like in the other configurations, the torque transmitting member 56 is disposed between the eccentric outer race 46 and the inner race 44. The torque transmitting member 56 operates to engage the interior surface 52 of the eccentric outer race 46 and the exterior surface 47 of the inner race 44 to transfer torque from the inner race 44 to the eccentric outer race 46. The cam 58 of the inner race 44 receives the torque transmitting member 56. The cam 58 includes a ramped surface 60 that can contact the torque transmitting member 56 and thereby apply a contact force F to the torque transmitting member 56. The inner race actuator 62 is coupled to the inner race 44 and controls lock-up of the two-way over-running clutch 40 by moving the inner race 44 relative to the first shaft 48 and, thus, the eccentric outer race 46 between the concentric position and one or more eccentric positions. As stated above, control of the inner race actuator 62 may be active or passive.

Still referring to FIG. 10, the inner race actuator 62 controls the lock-up direction of the two-way over-running clutch 40 by moving the inner race 44 relative to the first shaft 48 between the concentric position and the eccentric position(s) such as to vary the position of the inner race 44 relative to the eccentric outer race 46. Accordingly, actuation of the inner race actuator 62 controls whether the torque transmitting member 56 engages the first or second inclines 72, 74 of the cam 58 and the interior surface 52 of the outer race 46. In FIG. 10, the inner race actuator 62 has moved the inner race 44 to one of the eccentric positions such that the torque transmitting member 56 acts as a brake when the inner race 44 rotates in the clockwise direction. In other words, the torque transmitting member resists clockwise rotation of the inner race 44 because the eccentric outer race 46 is stationary and clockwise rotation of the inner race 44 causes the torque transmitting member 56 to engage the first incline 72 and the interior surface 52 of the eccentric outer race 46. Accordingly, the two-way over-running clutch 40 will act as a brake when the first shaft 48 is rotating in the clockwise direction and the inner race actuator 62 positions the inner race 44 as shown in FIG. 10. It should be appreciated that the inner race actuator 62 can also position the inner race 44 so that the two-way over-running clutch 40 will act as a brake when the first shaft 48 is rotating in the counter-clockwise direction while permitting clockwise rotation of the first shaft 48. Further still, other configurations are possible where the outer race 44 is stationary and is concentric with the central axis A of the first shaft 48. In such configurations, the inner race 44 moves between the concentric position and the eccentric position(s) to brake (i.e. slow or stop) the rotation of the inner shaft 48.

Of course, it should be appreciated that the number and geometry of the one or more cams 58 may vary and is influenced by the number and geometry of the one or more torque transmitting members 56. While the Figures herein show configurations having either one, two, or four torque transmitting members 56, a different number of torque transmitting members 56 may be utilized without departing from the scope of the present disclosure. Further, the number and configurations of the inner race actuator 62 may vary from that shown in the Figures.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A clutch assembly, comprising:
a first shaft;
an inner race rotatably coupled to said first shaft;
an outer race disposed annularly about said inner race;
at least one torque transmitting member disposed between said inner race and said outer race that selectively engages at least one of said inner race and said outer race to transfer torque between said inner race and said outer race;
said inner race being moveable in a radial direction; and
an actuator coupled to said at least one of said inner race and said outer race and controlling radial movement of said at least one of said inner race and said outer race in said radial direction to provide selective lock-up of said inner race and said outer race,
wherein said actuator is coupled to said inner race and moves said inner race in said radial direction between a concentric position where said inner race is concentrically aligned with said first shaft and at least one eccentric position where said inner race is eccentrically aligned with said first shaft.

2. The clutch assembly of claim 1, wherein said actuator provides selective lock-up of said inner race and said outer race by adjusting relative spacing of said inner race and said outer race at a location adjacent said at least one torque transmitting member.

3. The clutch assembly of claim 1, wherein said outer race is concentrically aligned with said first shaft.

4. The clutch assembly of claim 1, wherein at least one of said inner race and said outer race defines at least one cam that receives said at least one torque transmitting member, said at least one cam having a ramped surface that contacts said at least one torque transmitting member at an angle of incidence.

5. The clutch assembly of claim 4, wherein said first shaft has an exterior surface and said inner race has an interior surface that is disposed about and faces said exterior surface of said first shaft, wherein said actuator includes an actuator member that extends radially with respect to said first shaft and said inner race, and wherein said inner race includes an actuator cavity disposed along said interior surface of said inner race that receives said actuator member.

6. The clutch assembly of claim 5, wherein said actuator member is fixed to said first shaft and extends radially outwardly from said exterior surface of said first shaft into said actuator cavity in said inner race such that said actuator member rotatably couples said first shaft and said inner race.

7. The clutch assembly of claim 5, wherein said first shaft includes a recess disposed along said exterior surface of said first shaft, said recess in said first shaft permanently receiving said actuator member and said actuator member extending radially outwardly from said recess into said actuator cavity in said inner race such that said actuator member rotatably couples said first shaft and said inner race.

8. The clutch assembly of claim 5, wherein said first shaft includes a plurality of recesses that are circumferentially spaced about said exterior surface of said first shaft, each recess of said plurality of recesses being sized and shaped to receiving said actuator member.

9. The clutch assembly of claim 8, wherein said actuator selectively controls which recess of said plurality of recesses said actuator member is extended into to vary an angular position of said inner race relative to said first shaft, change said angle of incidence of said ramped surface of said at least one cam with respect to said at least one torque transmitting member, and adjust lock-up sensitivity between said inner race and said outer race.

10. The clutch assembly of claim 5, further comprising:
a controller in communication with said actuator that provides active control of said actuator.

11. The clutch assembly of claim 10, wherein said actuator is a solenoid including a coil that receives electricity from said controller and drives said actuator member between a retracted position and an extended position in response to electricity flow through said coil.

12. The clutch assembly of claim 10, wherein said actuator is a hydraulic actuator where said actuator cavity receives fluid from said controller to drive said actuator member between a retracted position and an extended position in response to fluid pressure within said actuator cavity.

13. The clutch assembly of claim 4, wherein said at least one cam includes at least one bi-directional cam disposed along said inner race with said ramped surface defining a valley between two opposing inclines, said two opposing inclines including a first incline that forces said at least one torque transmitting member to resist counter-clockwise rotation of said outer race with respect to said inner race and a second incline that forces said at least one torque transmitting member to resist clockwise rotation of said outer race with respect to said inner race.

14. The clutch assembly of claim 4, wherein said at least one cam includes at least a first directional cam and a second directional cam that are circumferentially spaced about said inner race with said first directional cam defining a first incline that forces said at least one torque transmitting member to resist counter-clockwise rotation of said outer race with respect to said inner race and said second directional cam defining a second incline that forces said at least one torque transmitting member to resist clockwise rotation of said outer race with respect to said inner race.

15. The clutch assembly of claim 14, wherein said at least one eccentric position includes a first eccentric position and a second eccentric position and wherein said actuator controls a lock-up direction of said inner race and said outer race by moving said inner race relative to said outer race between said first eccentric position where said first directional cam is moved toward said outer race and said second eccentric position where said second directional cam is moved toward said outer race.

16. The clutch assembly of claim 4, wherein said at least one torque transmitting member is a ball that moves along said ramped surface of said at least one cam between a free position where said ball is free to spin with respect to said outer race and said inner race, a sliding position where said ball is transmitting torque to said outer race by frictional sliding, and a locked position where said ball is squeezed between said ramped surface and said outer race to prevent said outer race from rotating in a direction opposite from a rotating direction of said inner race.

17. The clutch assembly of claim 4, wherein said at least one torque transmitting member is a cylindrical roller that moves along said ramped surface of said at least one cam between a free position where said cylindrical roller is free to spin with respect to said outer race and said inner race, a sliding position where said cylindrical roller is transmitting torque to said outer race by frictional sliding, and a locked position where said cylindrical roller is squeezed between said ramped surface and said outer race to prevent said outer race from rotating in a direction opposite from a rotating direction of said inner race.

18. The clutch assembly of claim 4, wherein said at least one torque transmitting member is a ratchet assembly including a ratchet arm pivotally connected to said outer race and a resilient member that biases said ratchet arm toward said inner race, said ratchet arm having a shape that freely slides over said ramped surface of said at least one cam when said outer race is rotating in one rotational direction with respect to said inner race and that locks into said at least one cam when said outer race is rotating in another rotational direction with respect to said inner race.

19. The clutch assembly of claim 1, wherein said actuator includes a rotor and a plurality of vanes extending from said rotor that move radially with respect to said rotor to form variable displacement chambers between said rotor and said inner race that pump fluid and passively control eccentricity of said inner race with respect to said first shaft based on fluid pressure.

20. The clutch assembly of claim 1, wherein said first shaft is rotatably coupled to an engine of a vehicle.

21. The clutch assembly of claim 1, wherein said first shaft is rotatably coupled to an output shaft of a transmission.

22. A clutch assembly of a transmission for coupling with an engine of a vehicle, comprising:
a first shaft rotatably coupled to the engine of the vehicle that defines a central axis;
a second shaft concentrically aligned with said central axis and rotatably coupled to an output shaft of the transmission;
a housing being concentrically aligned with said central axis and disposed about and radially spaced from at least a portion of one of said first shaft and said second shaft;

a two-way over-running clutch including an inner race and an outer race disposed annularly about said inner race;

said inner race being rotatably coupled to said first shaft and radially moveable relative to said first shaft;

said outer race being rotatably coupled to said housing;

at least one torque transmitting member disposed between said inner race and said outer race that selectively engages at least one of said inner race and said outer race in a locked position to transfer torque from said inner race to said outer race such that said inner race and said out race rotate together; and an inner race actuator coupled to said inner race that controls radial movement of said inner race relative to said first shaft.

23. The clutch assembly of claim 22, wherein said inner race is radially moveable relative to said first shaft between a concentric position where said inner race is concentrically aligned with said central axis and at least one eccentric position where said inner race is aligned with an eccentric axis that is radially spaced from said central axis.

24. The clutch assembly of claim 23, wherein said outer race is concentrically aligned with said central axis.

25. The clutch assembly of claim 24, wherein said inner race actuator controls radial movement of said inner race between said concentric position and said at least one eccentric position to provide selective lock-up of said inner race and said outer race by adjusting relative spacing of said inner race and said outer race at a location adjacent said at least one torque transmitting member.

26. The clutch assembly of claim 25, wherein said inner race includes at least one cam that receives said at least one torque transmitting member, said at least one cam having a ramped surface that contacts said at least one torque transmitting member.

27. The clutch assembly of claim 26, wherein said ramped surface of said at least one cam contacts said at least one torque transmitting member and, depending on an angular position of said inner race with respect to said first shaft and relative rotation of said inner race and said outer race, applies a contact force to said at least one torque transmitting member that biases said at least one torque transmitting member to a first position where said at least one torque transmitting member contacts said outer race.

28. The clutch assembly of claim 27, further comprising:
an elastic member adjacent said at least one torque transmitting member that biases said at least one torque transmitting member against said contact force to a second position where said at least one torque transmitting member is spaced away from said outer race.

29. The clutch assembly of claim 22, wherein said second shaft includes a hub portion defining a cavity that receives at least a portion of said first shaft and wherein a bearing assembly is disposed within said cavity of said second shaft between said hub portion of said second shaft and said first shaft, said bearing assembly supporting said first shaft within said cavity of said second shaft while permitting independent rotation of said first shaft and said second shaft.

30. The clutch assembly of claim 29, further comprising:
a wet clutch assembly selectively coupling rotation of said first shaft and said second shaft, said wet clutch assembly including a first friction plate rotatably coupled to said second shaft, a second friction plate slidably engaged with and rotatably coupled to said housing, and a wet clutch actuator assembly having an actuator piston and a biasing member, said actuator piston being operable to slide said second friction plate along said housing in a first direction moving toward said first friction plate and said biasing member being operable to bias said second friction plate in a second direction that opposes said first direction.

31. The clutch assembly of claim 22, further comprising:
a coupling that extends between and rotatably couples said first shaft and said second shaft such that said first shaft and said second shaft rotate together.

32. A clutch assembly, comprising:
a first shaft;
an inner race rotatably coupled to said first shaft that is moveable relative to said first shaft between a concentric position where said inner race is concentrically aligned with said first shaft and at least one eccentric position where said inner race is eccentrically aligned with said first shaft;
an outer race disposed annularly about said inner race that is concentrically aligned with said first shaft;
at least one torque transmitting member disposed between said outer race and said inner race that selectively engages at least one of said outer race and said inner race to transfer torque from said inner race to said outer race; and
an inner race actuator coupled to said inner race that controls movement of said inner race between said concentric position and said at least one eccentric position to provide selective lock-up of said inner race and said outer race by adjusting relative spacing of said inner race and said outer race at a location adjacent said at least one torque transmitting member.

* * * * *